US010250487B2

(12) United States Patent
Dave

(10) Patent No.: US 10,250,487 B2
(45) Date of Patent: Apr. 2, 2019

(54) DYNAMIC MODIFICATION OF BYPASS LABEL-SWITCHED PATHS BASED ON MONITORING NETWORK TRAFFIC CONDITIONS

(71) Applicant: Juniper Networks, Inc., Sunnyvale, CA (US)

(72) Inventor: Hiren Bhalchandra Dave, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 212 days.

(21) Appl. No.: 15/335,874

(22) Filed: Oct. 27, 2016

(65) Prior Publication Data

US 2018/0123947 A1    May 3, 2018

(51) Int. Cl.
*H04L 12/26*  (2006.01)
*H04L 12/707*  (2013.01)
(Continued)

(52) U.S. Cl.
CPC .......... *H04L 45/22* (2013.01); *H04L 43/0894* (2013.01); *H04L 45/28* (2013.01);
(Continued)

(58) Field of Classification Search
CPC ..... H04L 45/22; H04L 45/28; H04L 43/0894; H04L 45/50; H04L 47/17; H04L 47/24;
(Continued)

(56) References Cited

U.S. PATENT DOCUMENTS 8,000,327 B1 *   8/2011   Minei ..................... H04L 45/50
                                                              370/392
2006/0250948 A1   11/2006  Zamfir et al.
(Continued)

FOREIGN PATENT DOCUMENTS

WO   WO 2013/091688 A1    6/2013
WO      WO2016065747 A1 *  1/2016  ........... H04L 12/723

OTHER PUBLICATIONS

Juniper Networks, Inc., "MPLS Label Switching and Packet Forwarding," https://www.juniper.net/techpubs/en_US/junose10.3/information-products/topic-collections/swconfig-bgp-mpls/id-47854.html, Mar. 1, 2003, 9 pages.

(Continued)

*Primary Examiner* — Yemane Mesfin
*Assistant Examiner* — Abdelillah Elmejjarmi
(74) *Attorney, Agent, or Firm* — Harrity & Harrity, LLP

(57) ABSTRACT

A device may configure a dynamic set of bypass label-switched paths (LSPs), to protect one or more protected LSPs, based on configuration information. The dynamic set of bypass LSPs may be initially configured to include zero or more bypass LSPs. The configuration information may indicate a first condition for adding a bypass LSP to the dynamic set of bypass LSPs, and a second condition for removing a bypass LSP from the dynamic set of bypass LSPs. The device may determine that a network traffic condition, associated with the dynamic set of bypass LSPs, is satisfied. The device may modify the dynamic set of bypass LSPs to add, remove, or reconfigure one or more bypass LSPs based on determining that the network traffic condition is satisfied.

20 Claims, 8 Drawing Sheets

(51) Int. Cl.
    *H04L 12/703*     (2013.01)
    *H04L 12/723*     (2013.01)
    *H04L 12/801*     (2013.01)
    *H04L 12/851*     (2013.01)

(52) U.S. Cl.
    CPC .............. *H04L 45/50* (2013.01); *H04L 47/17* (2013.01); *H04L 47/24* (2013.01)

(58) Field of Classification Search
    CPC ... H04L 12/707; H04L 12/723; H04L 12/851; H04L 12/801; H04L 12/26; H04L 12/703
    See application file for complete search history.

(56) References Cited

U.S. PATENT DOCUMENTS

| | | | | |
|---|---|---|---|---|
| 2007/0237160 | A1* | 10/2007 | Natarajan | H04L 43/0894 370/397 |
| 2009/0232029 | A1* | 9/2009 | Abu-Hamdeh | H04L 41/0803 370/255 |
| 2013/0259056 | A1* | 10/2013 | Kotrabasappa | H04L 45/24 370/401 |
| 2014/0301192 | A1* | 10/2014 | Lee | H04L 47/10 370/230 |

OTHER PUBLICATIONS

Pan et al., "Fast Reroute Extensions to RSVP-TE for LSP Tunnels," https://tools.ietf.org/html/rcc4090, May 2005, 38 pages.
Extended European Search Report corresponding to EP 17164264.8, dated Dec. 8, 2017, 7 pages.

\* cited by examiner

DYNAMIC MODIFICATION OF BYPASS LABEL-SWITCHED PATHS BASED ON MONITORING NETWORK TRAFFIC CONDITIONS

BACKGROUND

In a multiprotocol label switching (MPLS) network, data packets may be forwarded between one or more network nodes based on short path labels, rather than via long network internet protocol (IP) addresses. A label-switched path (LSP) is a path through an MPLS network that forwards data packets based on short path labels.

SUMMARY

According to some possible implementations, a device may include one or more processors to configure a dynamic set of bypass label-switched paths (LSPs), to protect one or more protected LSPs, based on configuration information. The dynamic set of bypass LSPs may be initially configured to include zero or more bypass LSPs. The configuration information may indicate a first condition for adding a bypass LSP to the dynamic set of bypass LSPs, and a second condition for removing a bypass LSP from the dynamic set of bypass LSPs. The one or more processors may determine that a network traffic condition, associated with the dynamic set of bypass LSPs, is satisfied. The one or more processors may modify the dynamic set of bypass LSPs to add, remove, or reconfigure one or more bypass LSPs based on determining that the network traffic condition is satisfied.

According to some possible implementations, a non-transitory computer-readable medium may store one or more instructions that, when executed by one or more processors, cause the one or more processors to configure a dynamic set of bypass label-switched paths (LSPs), to protect one or more protected LSPs, based on configuration information. The dynamic set of bypass LSPs may be initially configured to include zero or more bypass LSPs. The configuration information may indicate one or more conditions for modifying the dynamic set of bypass LSPs to add, remove, or reconfigure one or more bypass LSPs. The one or more instructions may cause the one or more processors to determine that a condition, of the one or more conditions, is satisfied. The one or more instructions may cause the one or more processors to modify the dynamic set of bypass LSPs based on determining that the condition is satisfied.

According to some possible implementations, a method may include configuring, by a device, a dynamic set of bypass label-switched paths (LSPs), to protect one or more protected LSPs, based on configuration information. The dynamic set of bypass LSPs may be initially configured to include zero or more bypass LSPs. The configuration information may indicate at least one of: a first condition for adding a bypass LSP to the dynamic set of bypass LSPs, a second condition for removing a bypass LSP from the dynamic set of bypass LSPs, or a third condition for reconfiguring a bypass LSP included in the dynamic set of bypass LSPs. The method may include determining, by the device, that a network traffic condition associated with the dynamic set of bypass LSPs is satisfied. The method may include modifying, by the device, the dynamic set of bypass LSPs to add, remove, or reconfigure one or more bypass LSPs based on determining that the network traffic condition is satisfied.

DETAILED DESCRIPTION

The following detailed description of example implementations refers to the accompanying drawings. The same reference numbers in different drawings may identify the same or similar elements.

In an MPLS network, a bypass LSP may be used to protect traffic transmitted via a primary LSP in case a node or a link on the primary LSP fails. In some cases, a bypass LSP may serve as a backup path for multiple primary LSPs. However, this many-to-one configuration may lead to oversubscription and congestion of network traffic if one or more primary LSPs fail. For example, a node or a link that carries network traffic for one or more primary LSPs and that is included in a bypass LSP may become congested if the bypass LSP begins carrying traffic.

Implementations described herein include a network device that uses a dynamic set of bypass LSPs (e.g., a container) and is capable of dynamically adding or removing bypass LSPs to the set based on network requirements and traffic conditions. By dynamically adding bypass LSPs as needed, the network device prevents or reduces network congestion and LSP oversubscription. By dynamically removing bypass LSPs that are no longer needed, the network device conserves computing resources (e.g., processor resources and memory resources). Furthermore, the network device may be capable of discovering and configuring bypass LSPs as needed without pre-provisioning multiple bypass LSPs, thereby further conserving computing resources (e.g., memory resources and network resources).

Figure 1A:
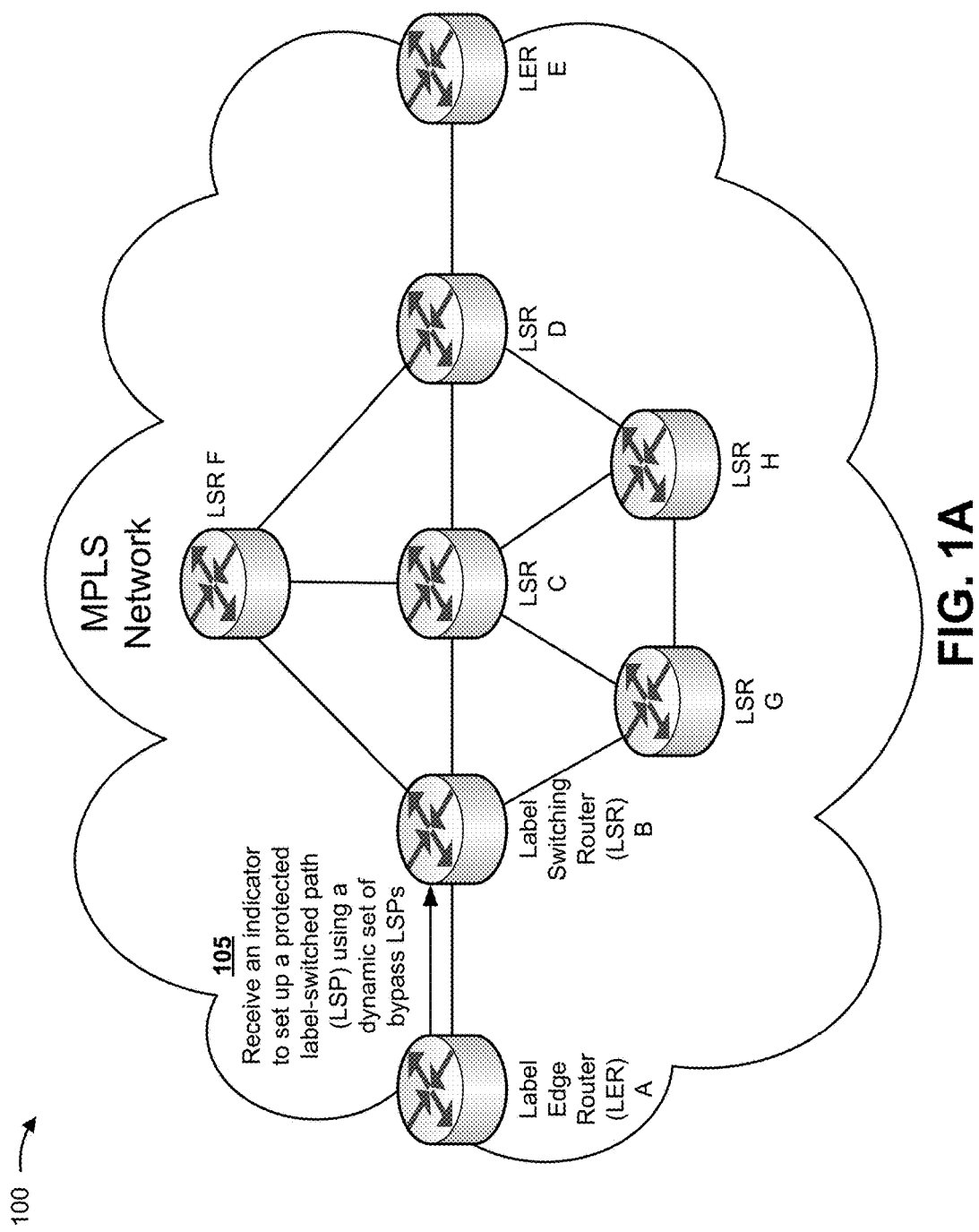
FIGS. 1A-1E are diagrams of an overview of an example implementation described herein.

FIGS. 1A-1E are diagrams of an overview of an example implementation 100 described herein. As shown in FIG. 1A, an MPLS network may include a group of interconnected routers, such as one or more label edge routers (LERs) and label switching routers (LSRs) that forward packets using MPLS. In some implementations, as shown by reference number 105, an MPLS device (e.g., LSR B) may receive an indicator (e.g., from LER A) to set up one or more protected LSPs using a dynamic set of bypass LSPs. For example, LSR B may receive the indicator via an LSP signaling message, and the signaling message may include a bypass flag that instructs LSR B to set up a protected LSP.

Figure 1B:
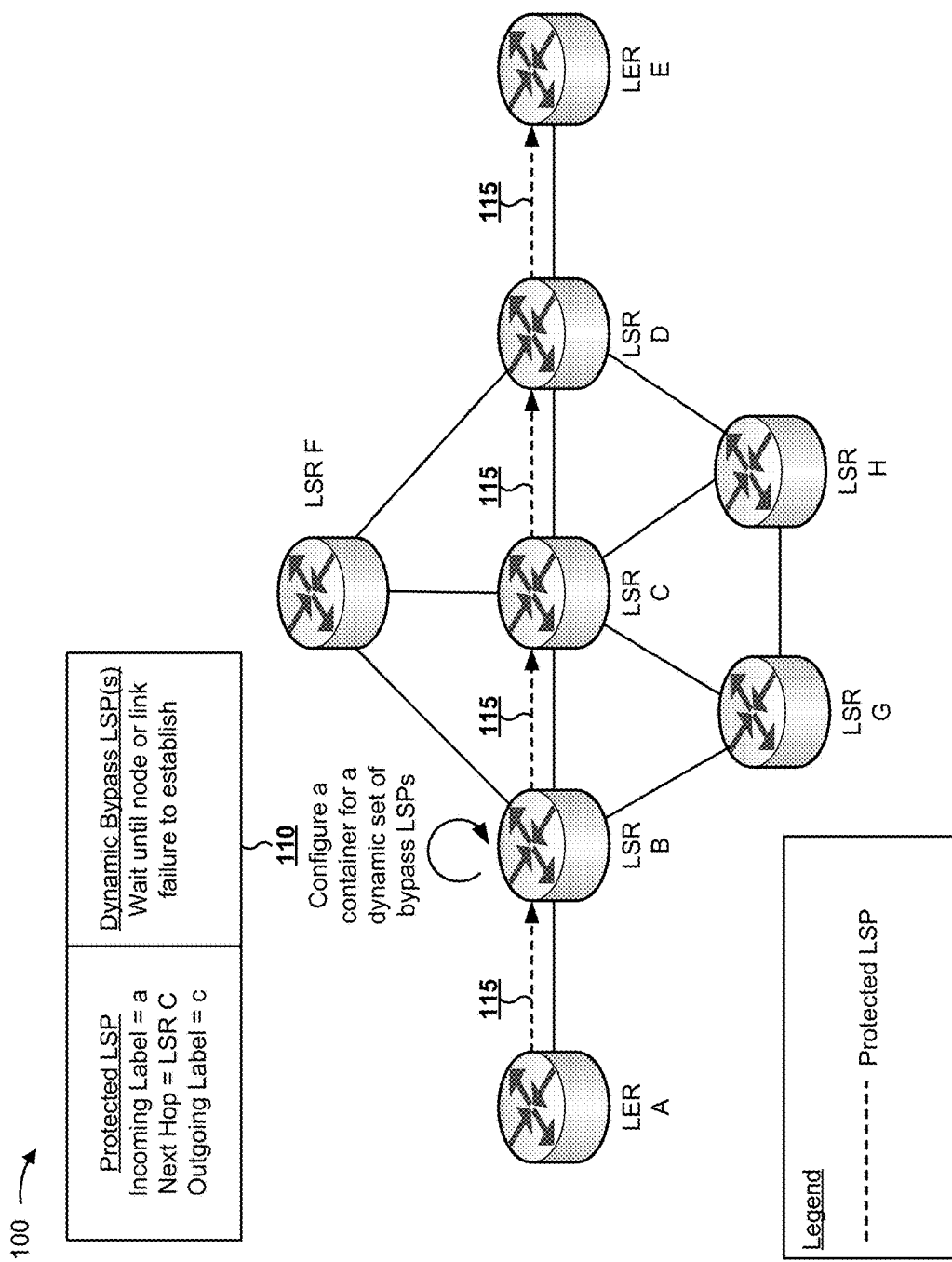

As shown in FIG. 1B, and by reference number 110, LSR B may configure a container for a dynamic set of bypass LSPs. For example, LSR B may configure the dynamic set of bypass LSPs to establish protection for the protected LSP (e.g., by establishing a bypass LSP) in the event of a node or link failure. As shown by reference number 115, the path for the protected LSP may travel from LER A to LSR B to LSR C to LSR D to LER E. The dynamic set of bypass LSPs, while not yet established, may provide one or more alternative paths in the event that node or link failure prevents the forwarding of packets along the protected LSP.

As shown, LSR B may receive an incoming packet with information indicating an MPLS label (e.g., label "a"). LSR B may remove the label from the packet (e.g., the label may be removed from the header of the packet), and LSR B may use the value of the label as an index in a forwarding table. The forwarding table may be used to determine the next hop destination (e.g., "LSR C") and the outgoing label (e.g., label "c"). In some implementations, LSR B may not initially establish a bypass LSP to preserve the protected LSP, but may establish a bypass LSP upon a node or link failure. In other example configurations, LSR B may initially establish a bypass LSP, as described further herein. Additionally, or alternatively, LSR B may configure other parameters for the dynamic set of bypass LSPs, such as a maximum quantity of bypass LSPs permitted to be created in the dynamic set, a maximum number of hops for a bypass LSP, a maximum and minimum bandwidth threshold that trigger a bypass LSP to be added to or removed from the dynamic set, or the like.

Figure 1C:
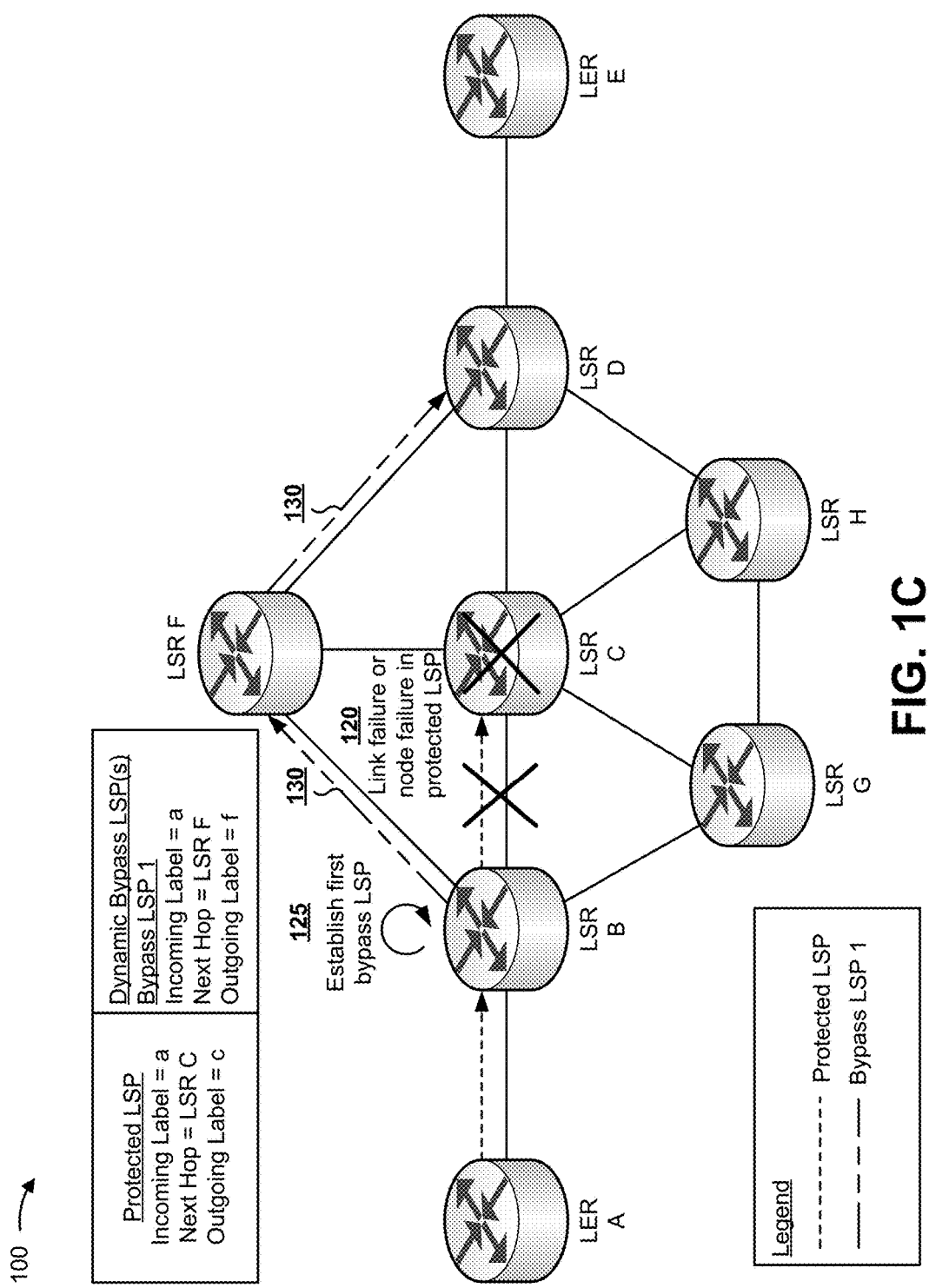

As shown in FIG. 1C, and by reference number 120, a link failure in the protected LSP may occur on a link between LSR B and LSR C, or a node failure may occur in LSR C. As a result, and as shown by reference number 125, LSR B may establish a first bypass LSP based on detecting the failure. In some implementations, LSR B may establish the first bypass LSP by exchanging LSP signaling messages with neighboring nodes.

As shown by reference number 130, using the first bypass LSP, LSR B may forward packets to LSR F rather than LSR C. For example, LSR B may receive an incoming packet with information indicating an MPLS label (e.g., label "a"). LSR B may remove the label from the packet, and LSR B may use the value of the label as an index in a forwarding table. However, due to the link or node failure, the forwarding table may reference values associated with the next destination in the bypass LSP (e.g. the value of the next hop may be "LSR F" and the value of the outgoing label may be "f"), as opposed to the next destination in the protected LSP (e.g., the next hop value of "LSR C" and the outgoing label of "c"). By dynamically establishing bypass LSPs based on detecting node or link failures, the MPLS device (e.g., LSR B) conserves memory and processing resources by creating bypass LSPs only when the bypass LSPs are needed. Furthermore, the MPLS device (e.g., LSR B) provides dynamic creation and establishment of bypass LSPs while still providing traffic protection via protected LSPs.

Figure 1D:
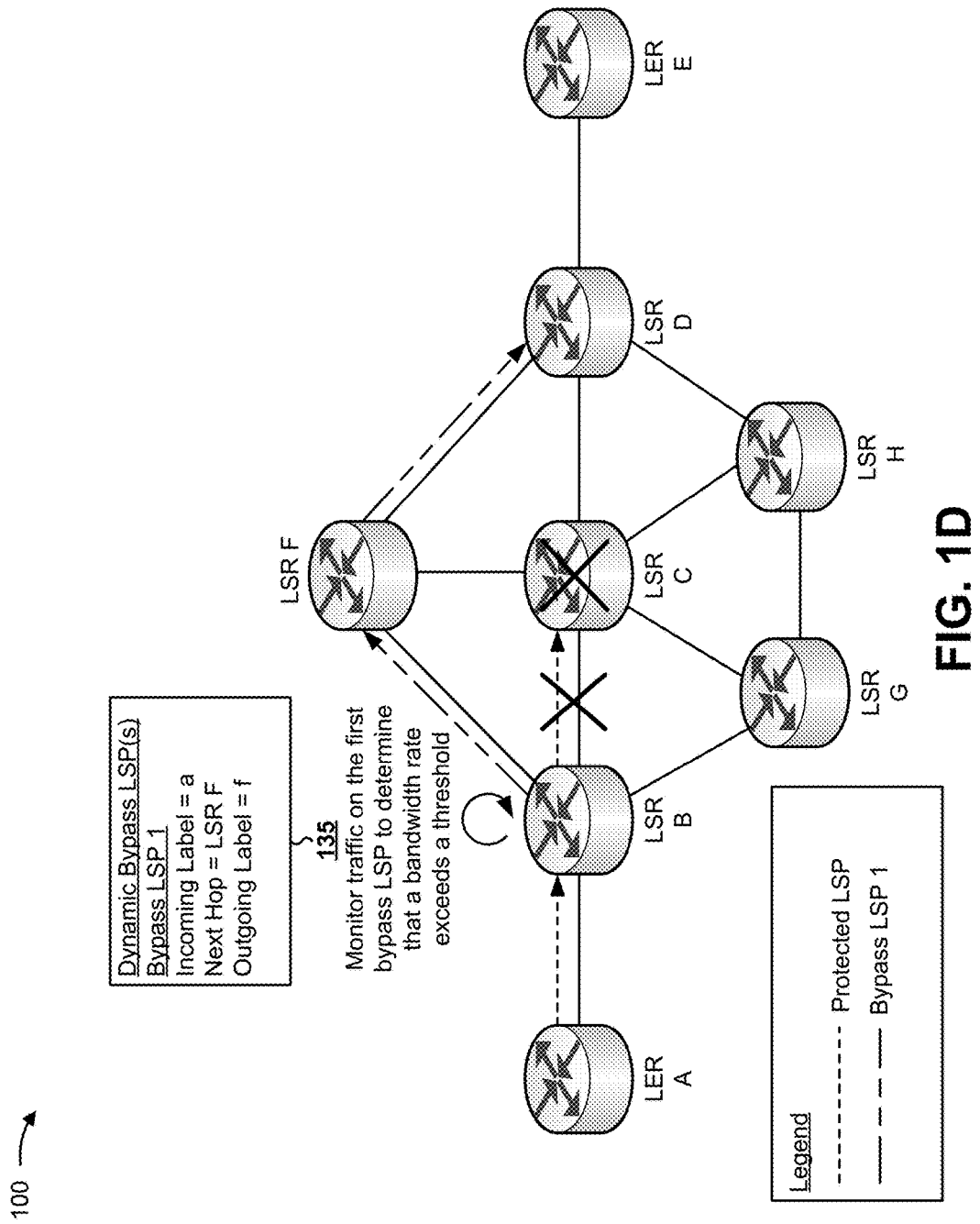

As shown in FIG. 1D, and by reference number 135, LSR B may monitor network traffic conditions on the first bypass LSP and may determine that a bandwidth rate exceeds a threshold. For example, LSR B may monitor network traffic conditions by counting the quantity of bytes or by measuring the bandwidth rate of traffic on the first bypass LSP. When the quantity of bytes or bandwidth rate exceeds the threshold, LSR B may dynamically establish an additional bypass LSP to reduce network congestion on the first bypass LSP.

Figure 1E:
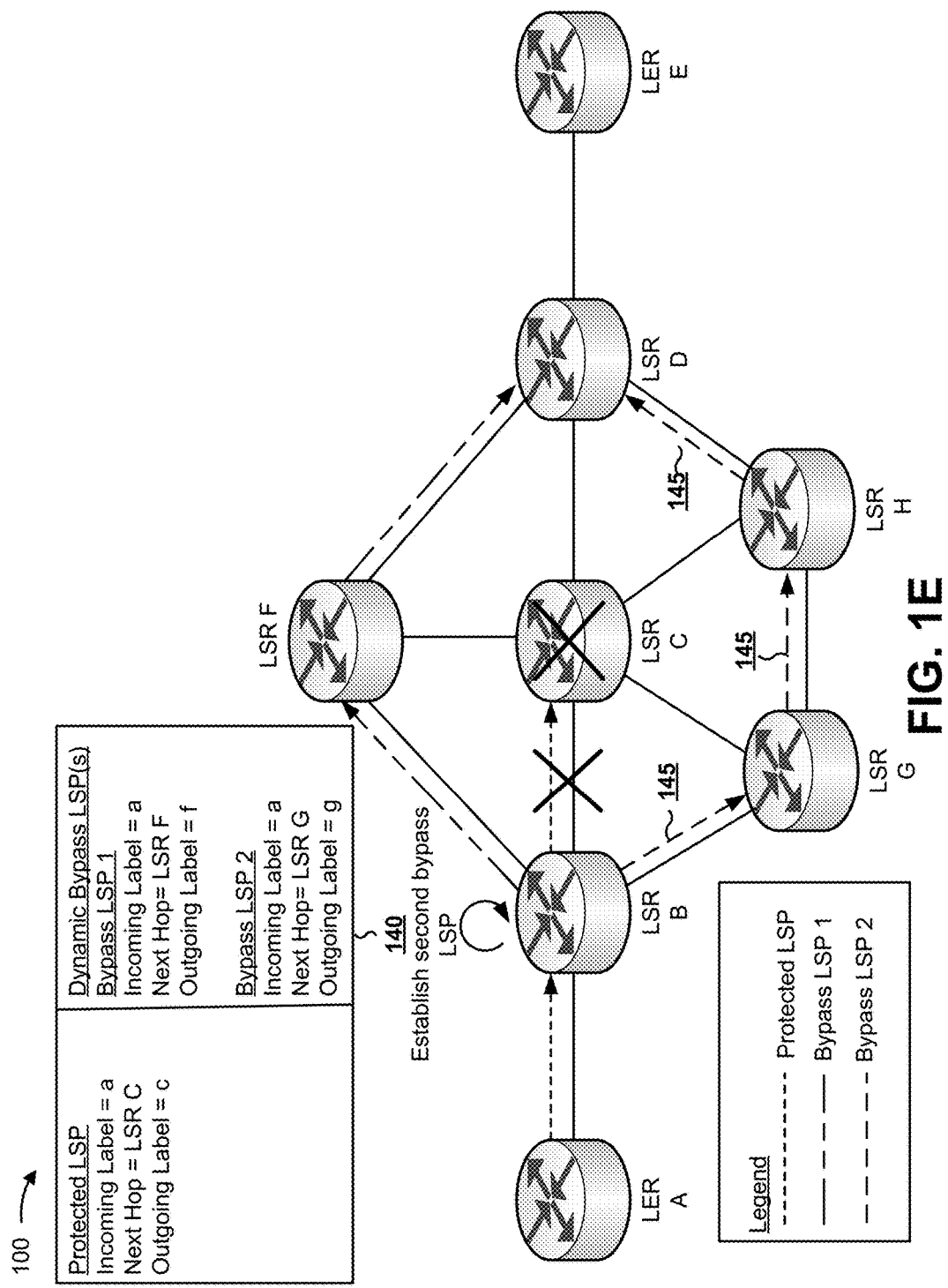

As shown in FIG. 1E, and by reference number 140, based on determining that network traffic on the first bypass LSP exceeds the threshold, LSR B may establish a second bypass LSP. LSR B may establish the second bypass LSP by exchanging LSP signaling messages with neighboring nodes. As shown by reference number 145, the second bypass LSP may forward packets from LSR B to LSR G to LSR H to LSR D (i.e., instead of using the protected LSP which was interrupted due to node or link failure, and instead of using the first bypass LSP which is experiencing heavy network traffic and congestion). As an example, LSR B may receive an incoming packet with information indicating an MPLS label (e.g., label "a"). LSR B may use the value of the label as an index in a forwarding table. However, due to the link or node failure in LSR C, and due to the first bypass LSP experiencing heavy network traffic and congestion, the forwarding table may reference values associated with the next destination in the second bypass LSP (e.g., the value of the next hop may be "LSR G" and the value of the outgoing label may be "g"), as opposed to values associated with the protected LSP and the first bypass LSP.

By dynamically adding an LSP on an as-needed basis, the MPLS device ensures that the first bypass LSP is not overloaded with too much network traffic. Furthermore, additional bypass LSPs may be added (e.g., if both the first bypass LSP and the second bypass LSP are experiencing heavy network traffic), or removed (e.g., if the link or node failure on the protected LSP is resolved or if network traffic becomes light), allowing the MPLS device to balance the conservation of resources of LSRs with the ability to provide backup protection for LSPs.

As indicated above, FIGS. 1A-1E are provided merely as an example. Other examples are possible and may differ from what was described with regard to FIGS. 1A-1E.

Figure 2:
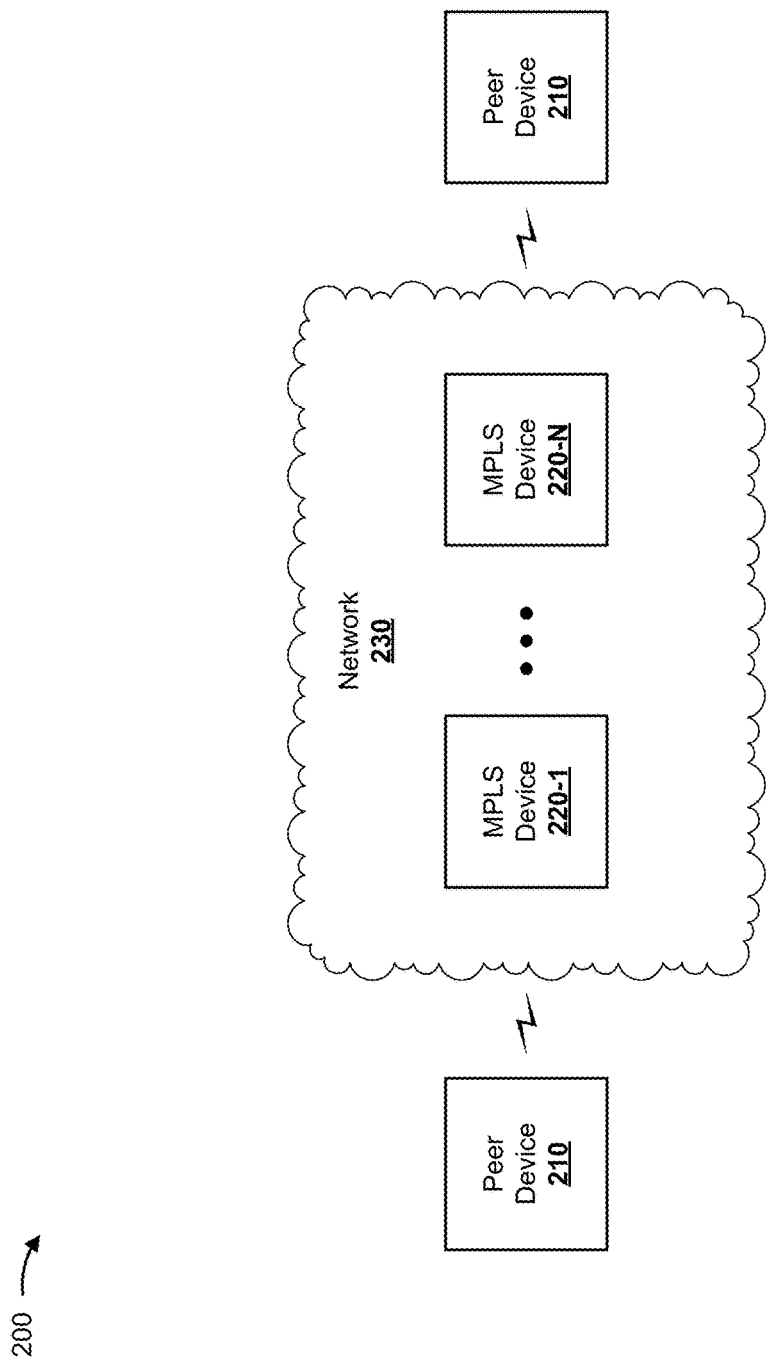
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, one or more MPLS devices 220-1 through 220-N (N≥1) (hereinafter referred to collectively as "MPLS devices 220," and individually as "MPLS device 220"), and a network 230. Devices of environment 200 may interconnect via wired connections, wireless connections, or a combination of wired and wireless connections.

Peer device 210 includes one or more devices capable of receiving and/or providing network traffic. For example, peer device 240 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using MPLS device(s) 220 as an intermediary).

MPLS device 220 includes one or more devices (e.g., one or more traffic transfer devices) capable of processing, forwarding, and/or transferring traffic between peer devices (e.g., peer devices 210) and/or routing devices (e.g., other MPLS devices 220). For example, MPLS device 220 may include a router (e.g., a label switching router (LSR), a label edge router (LER), an ingress router, an egress router, a provider router, etc.), a gateway, a switch, a firewall, a hub, a bridge, a reverse proxy, a server (e.g., a proxy server), a security device, an intrusion detection device, a load balancer, or any traffic transfer device that uses MPLS to forward packets.

Network 230 includes one or more wired and/or wireless networks. For example, network 230 may include an MPLS network. Additionally, or alternatively, network 230 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, network 230 may include an MPLS network. An MPLS network is a network that provides efficient packet forwarding by applying labels to packets (e.g., a value stored in the header of the packets). The labels are added at the ingress of the MPLS network and are removed at the egress of the MPLS network. MPLS is less computationally expensive than routing based on IP addresses because the labels are shorter than IP addresses and may be located faster when querying a routing or forwarding table.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
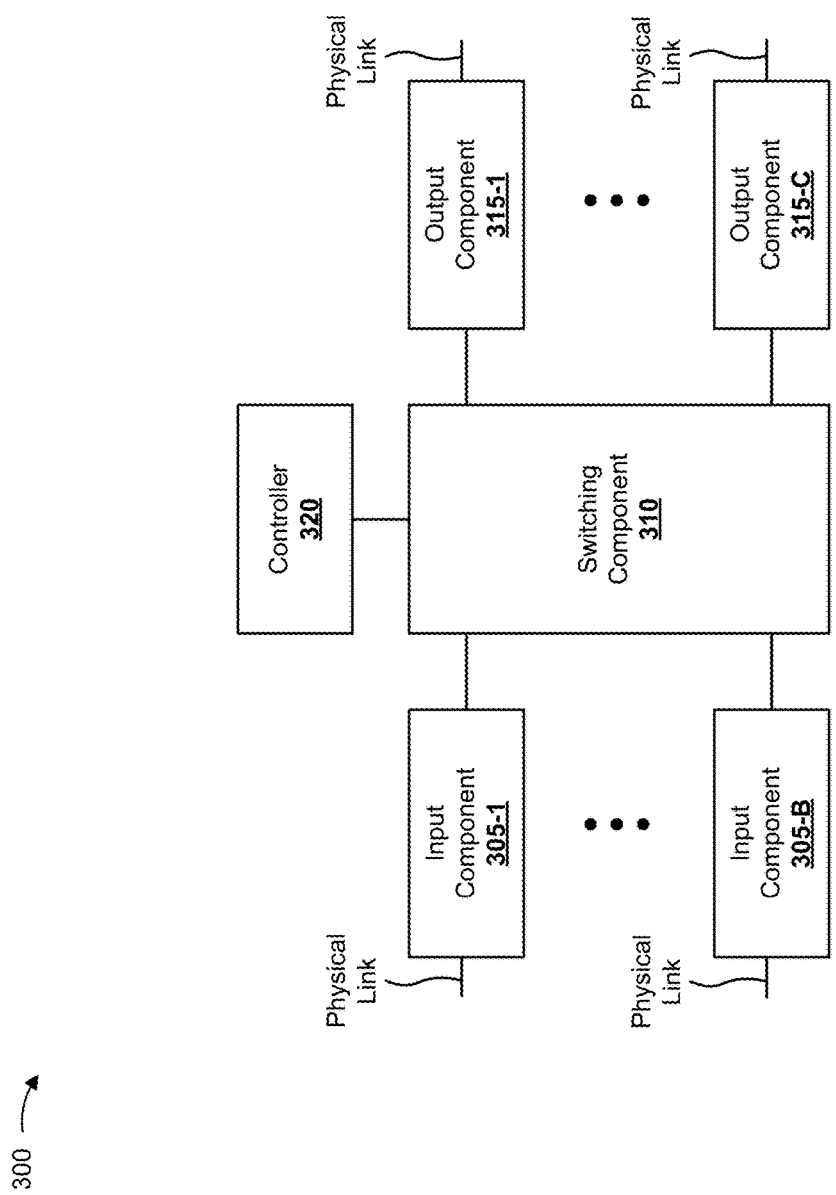
FIG. 3 is a diagram of example components of one or more devices of FIG. 2.

FIG. 3 is a diagram of example components of a device 300. Device 300 may correspond to peer device 210 and/or MPLS device 220. In some implementations, peer device 210 and/or MPLS device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
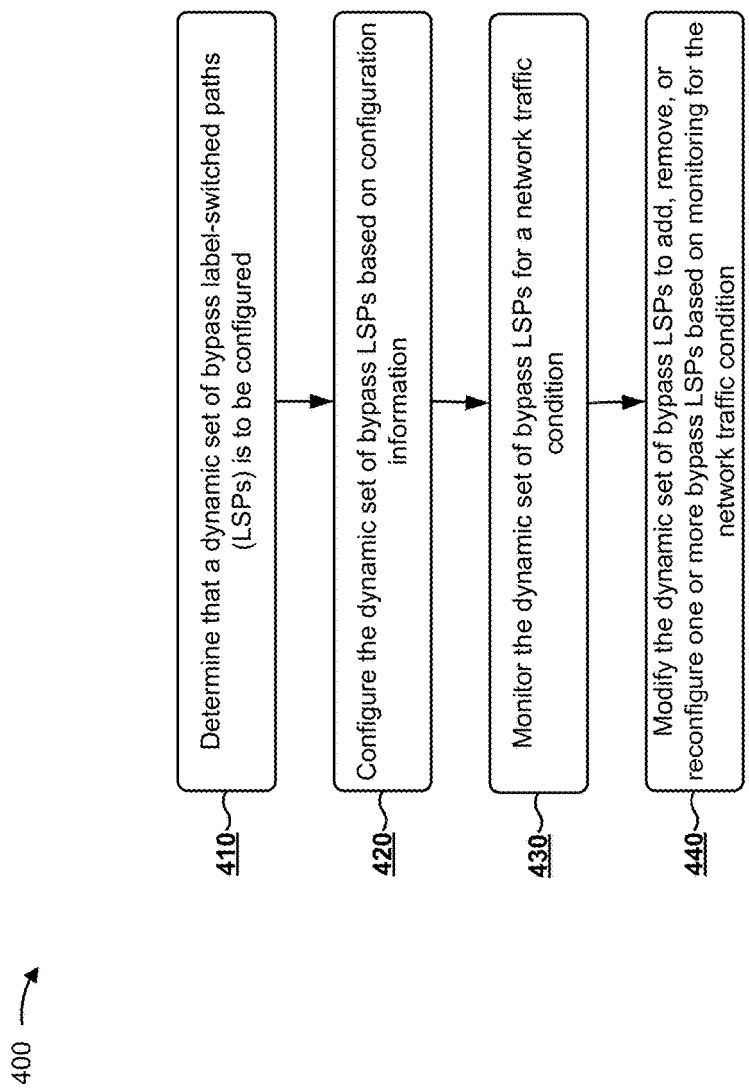
FIG. 4 is a flow chart of an example process for configuring and establishing a dynamic set of bypass LSPs, and modifying the dynamic set of bypass LSPs based on network traffic conditions.

FIG. 4 is a flow chart of an example process 400 for configuring and establishing a dynamic set of bypass LSPs, and modifying the dynamic set of bypass LSPs based on network traffic conditions. In some implementations, one or more process blocks of FIG. 4 may be performed by MPLS device 220. In some implementations, one or more process blocks of FIG. 4 may be performed by another device or a group of devices separate from or including MPLS device 220, such as peer device 210.

As shown in FIG. 4, process 400 may include determining that a dynamic set of bypass label-switched paths (LSPs) is to be configured (block 410). For example, MPLS device 220 may determine that a dynamic set of bypass LSPs is to be configured when MPLS device 220 receives an LSP signaling message from another device (e.g., another MPLS device 220) on network 230. In this case, the LSP signaling message may include configuration information associated with setting up protected LSPs by configuring or establishing bypass LSPs.

In some implementations, the LSP signaling message may include a dynamic bypass flag explicitly requesting MPLS device 220 to configure and/or establish the dynamic set of bypass LSPs. For example, the LSP signaling message may include a dynamic bypass flag that requests MPLS device 220 to set up one or more protected LSPs using a dynamic set of LSPs. In this case, MPLS device 220 may configure and/or establish the dynamic set of bypass LSPs based on receiving the LSP signaling message with the dynamic bypass flag.

In some implementations, the LSP signaling message may include a bypass flag requesting MPLS device 220 to establish a bypass LSP, but that does not explicitly request MPLS device 220 to establish the dynamic set of bypass LSPs. In this case, MPLS device 220 may determine whether to configure and/or establish the dynamic set of bypass LSPs based on a local configuration of MPLS device 220 (e.g., that indicates whether to configure and/or establish the dynamic set of bypass LSPs when a bypass flag is received). This provides MPLS device 220 with backward compatibility with legacy systems.

In some implementations, the LSP signaling message may omit an indication of whether to establish a bypass LSP for the protected LSP. In this case, MPLS device 220 may determine whether to configure and/or establish the dynamic set of bypass LSPs based on a local configuration of MPLS device 220 (e.g., that indicates whether to configure and/or establish the dynamic set of bypass LSPs when an LSP signaling message is silent as to whether to establish a bypass LSP). As an example, MPLS device 220 may receive an LSP signaling message that does not indicate whether to establish a bypass LSP for the protected LSP. Here, MPLS device 220 may access configuration information stored in local memory that indicates whether to configure and/or establish the dynamic set of bypass LSPs.

As further shown in FIG. 4, process 400 may include configuring the dynamic set of bypass LSPs based on configuration information (block 420). For example, MPLS device 220 may receive and/or store configuration information that indicates a manner in which the dynamic set of bypass LSPs is to be configured. In some implementations, MPLS device 220 may receive the configuration information in association with the LSP signaling message. For example, the configuration information may be included in the LSP signaling message. In this way, MPLS device 220 may customize a configuration of the dynamic set of bypass LSPs based on a request associated with a particular LSP.

Additionally, or alternatively, MPLS device 220 may store the configuration information based on input received from a network administrator. For example, MPLS device 220 may receive configuration information input from a network administrator, and MPLS device 220 may store the configuration information. By allowing a network administrator to input configuration information, MPLS device 220 may apply a common configuration across multiple protected LSPs.

In some implementations, the configuration information received and/or stored by MPLS device 220 may indicate a quantity of bypass LSPs to be initially configured for the dynamic set of bypass LSPs. For example, the configuration information may indicate that zero bypass LSPs are to be initially configured and/or established for the dynamic set of bypass LSPs. In this case, MPLS device 220 may store information that identifies one or more protected LSPs and an indication that the protected LSPs are to be protected by the dynamic set of bypass LSPs, but may not actually configure the dynamic set of bypass LSPs until a network failure is detected. As an example, MPLS device 220 may prevent information that identifies a next hop, an incoming label, an outgoing label, or the like, regarding the dynamic set of bypass LSPs, from being stored by MPLS device 220. In this way, MPLS device 220 may conserve memory resources while still protecting the primary LSPs by waiting to configure one or more bypass LSPs until a failure is detected.

As another example, the configuration information may indicate that one bypass LSP is to be initially configured and/or established for the dynamic set of bypass LSPs. In this case, MPLS device 220 may store information that identifies one or more protected LSPs, and may further store an indication of the bypass LSP, included in the dynamic set of bypass LSPs, that protects the protected LSPs. For example, MPLS device 220 may store information that identifies a next hop, an incoming label, an outgoing label, etc. for the bypass LSP. In this way, MPLS device 220 may provide for fast failover while still conserving computing resources that would otherwise be consumed if multiple bypass LSPs were initially configured.

As another example, the configuration information may indicate that multiple bypass LSPs are to be initially configured and/or established for the dynamic set of bypass LSPs, in a similar manner as described above. This may allow MPLS device 220 to initially configure and/or establish a particular quantity of bypass LSPs based on customer requirements, network traffic requirements, or the like. As an example, if network traffic is higher than usual during a certain time period, the configuration information may indicate to initially establish enough bypass LSPs to account for the increase in traffic.

Additionally, or alternatively, the configuration information may indicate a maximum or a minimum quantity of bypass LSPs permitted to be established for the dynamic set of bypass LSPs. For example, when establishing a new bypass LSP for the dynamic set of bypass LSPs, MPLS device 220 may verify that the maximum quantity of bypass LSPs is not exceeded. As another example, MPLS device 220 may verify that the minimum quantity of bypass LSPs will be maintained when removing a bypass LSP from the dynamic set of bypass LSPs. In this way, MPLS device 220 may limit a quantity of bypass LSPs to conserve memory resources.

Additionally, or alternatively, the configuration information may indicate a maximum quantity of hops permitted per bypass LSP. For example, when establishing a new bypass LSP for the dynamic set of bypass LSPs, MPLS device 220 may determine the number of hops on a potential bypass LSP to ensure that the bypass LSP does not have more hops than the maximum quantity of hops. In this way, MPLS device 220 may reduce network latency by limiting a quantity of hops for network traffic.

Additionally, or alternatively, the configuration information may indicate one or more threshold bandwidths per bypass LSP. For example, the configuration information may indicate a maximum threshold bandwidth for a bypass LSP. In this case, if the traffic volume on the bypass LSP is greater than or equal to the maximum threshold bandwidth, then MPLS device 220 may establish an additional bypass LSP for the dynamic set of bypass LSPs.

As another example, the configuration information may indicate a minimum threshold bandwidth for a bypass LSP. In this case, if the traffic volume on the bypass LSP (or on multiple bypass LSPs) is less than or equal to the minimum threshold bandwidth, then MPLS device 220 may remove a bypass LSP from the dynamic set of bypass LSPs. In this way, MPLS device 220 may prevent bypass LSPs from being oversubscribed or flooded by adding bypass LSPs when traffic volume is high, and may conserve computing resources by removing bypass LSPs when traffic volume is low.

In some implementations, MPLS device 220 may be configured to use different configuration parameters for different bypass LSPs. For example, MPLS device 220 may establish a first bypass LSP with a first maximum quantity of hops (e.g., three hops), and may establish a second bypass LSP (e.g., at a later time) with a second maximum quantity of hops (e.g., four hops). As another example, MPLS device 220 may establish a first bypass LSP with a first threshold bandwidth (e.g., a higher bandwidth), and may establish a second bypass LSP (e.g., at a later time) with a second threshold bandwidth (e.g., a lower bandwidth). In this way, MPLS device 220 may relax or tighten constraints on bypass LSPs as additional bypass LSPs are established (e.g., to satisfy network traffic requirements, reduce network congestion, conserve processing resources, etc.).

As further shown in FIG. 4, process 400 may include monitoring the dynamic set of bypass LSPs for a network traffic condition (block 430). For example, MPLS device 220 may monitor one or more bypass LSPs, of the dynamic set of bypass LSPs, for a network traffic condition. In some implementations, MPLS device 220 may monitor the dynamic set of bypass LSPs to determine whether a network traffic condition satisfies a threshold. As an example, MPLS device 220 may determine whether a network traffic volume (e.g., a bandwidth, a quantity of bytes, etc.) satisfies a threshold for a particular bypass LSP, whether an overall network traffic volume for the dynamic set of by bypass LSPs satisfies a threshold, or the like.

Additionally, or alternatively, MPLS device 220 may determine whether a first traffic volume on a first bypass LSP satisfies a first threshold, whether a second traffic volume on a second bypass LSP satisfies a second threshold, or the like (e.g., for a third bypass LSP, a fourth bypass LSP, etc.). In some implementations, two or more thresholds for different bypass LSPs may be the same (e.g., the first threshold may be the same as the second threshold). In other cases, two or more thresholds for different bypass LSPs may be different (e.g., the first threshold may be different than the second threshold).

Additionally, or alternatively, MPLS device 220 may monitor one or more bypass LSPs, included in the dynamic set of bypass LSPs, to determine whether another network traffic parameter (e.g., other than network traffic volume) satisfies a threshold. For example, MPLS device 220 may monitor a Quality of Service (QoS) parameter or another type of network traffic parameter, such as latency, jitter, packet error rate, bit rate, throughput, transmission delay, availability, or the like. In this way, MPLS device 220 may assist with ensuring that traffic requirements are satisfied.

As further shown in FIG. 4, process 400 may include modifying the dynamic set of bypass LSPs to add, remove, or reconfigure one or more bypass LSPs based on monitoring for the network traffic condition (block 440).

In some implementations, MPLS device 220 may add a bypass LSP to the dynamic set of bypass LSPs based on the network traffic condition. For example, MPLS device 220 may add or establish a bypass LSP by exchanging LSP signaling messages with other MPLS devices 220 (e.g., neighboring devices, etc.). In this case, prior to adding or establishing the bypass LSP, MPLS device 220 may first check to verify that the maximum quantity of bypass LSPs is not exceeded. Additionally, or alternatively, MPLS device 220 may add or establish a bypass LSP when a network traffic condition is satisfied, such as a volume of network traffic exceeding a threshold, as described above. Additionally, or alternatively, MPLS device 220 may establish a new bypass LSP according to configuration information, such as a maximum number of hops, a maximum threshold bandwidth for adding an additional bypass LSP, a minimum threshold bandwidth for removing the new bypass LSP, or the like. MPLS device 220 may add or establish a bypass LSP by storing information regarding the bypass LSP (e.g., an incoming label, a next hop, an outgoing label, etc.).

In some implementations, MPLS device 220 may remove a bypass LSP from the dynamic set of bypass LSPs based on the network traffic condition. For example, MPLS device 220 may remove a bypass LSP by exchanging LSP signaling messages with other MPLS devices 220 (e.g., neighboring devices, etc.). As an example, MPLS device 220 may remove the bypass LSP when a network traffic condition is satisfied, such as a volume of network traffic being less than a threshold, as described above. MPLS device 220 may remove a bypass LSP by deleting (from memory) information regarding the bypass LSP (e.g., an incoming label, a next hop, an outgoing label, etc.).

Additionally, or alternatively, MPLS device 220 may reconfigure an existing bypass LSP based on the network traffic condition. For example, MPLS device 220 may reconfigure an existing bypass LSP by adding one or more hops, removing one or more hops, modifying a quantity of resources dedicated to the bypass LSP, modifying a configuration parameter, or the like. As an example, MPLS device 220 may remove a hop and add a replacement hop to an existing bypass LSP to create a new path to a destination device (e.g., to peer device 210). In this case, an LSR on the bypass LSP may be receiving higher than usual congestion, and it may be more efficient to remove the hop to that particular LSR and to replace that hop with a neighboring hop to a different LSR. By dynamically adding, removing, and/or reconfiguring bypass LSPs on an as-needed basis, MPLS device 220 is able to balance the conservation of resources of LSRs with the ability to provide backup protection for LSPs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By configuring and establishing a dynamic set of bypass LSPs to monitor and preserve protected LSPs, MPLS device 220 prevents or reduces network congestion and LSP oversubscription. In addition, MPLS device 220 conserves computing resources (e.g., processor resources and memory resources) by removing bypass LSPs that are no longer needed. Furthermore, MPLS device 220 conserves computing resources by reconfiguring bypass LSPs (e.g., by adding and/or removing hops) to create more reliable and efficient paths.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A multiprotocol label switching device, comprising:
a memory; and
one or more processors to:
   determine a dynamic set of bypass label-switched paths (LSPs), to protect one or more protected LSPs, based on configuration information,
      the dynamic set of bypass LSPs being initially determined to include zero or more bypass LSPs, and
      the configuration information indicating:
         a first condition for adding a bypass LSP to the dynamic set of bypass LSPs,
         a second condition for removing a bypass LSP from the dynamic set of bypass LSPs, and
         a maximum quantity of bypass LSPs permitted to be established for the dynamic set of bypass LSPs;
   monitor the dynamic set of bypass LSPs for a network traffic condition;
   determine that the network traffic condition, associated with the dynamic set of bypass LSPs, is satisfied based on monitoring the dynamic set of bypass LSPs;
   modify the dynamic set of bypass LSPs to add one or more bypass LSPs based on determining that the network traffic condition is satisfied,
      where the one or more processors, when modifying the dynamic set of bypass LSPs, are to:
         verify that the maximum quantity of bypass LSPs will not be exceeded by adding a bypass LSP to the dynamic set of bypass LSPs; and
         add the bypass LSP to the dynamic set of bypass LSPs based on verifying that the maximum quantity of bypass LSPs will not be exceeded; and
   forward a data packet to a network node using a bypass LSP included in the modified dynamic set of bypass LSPs.

2. The device of claim 1, where the one or more processors are further to:
receive an LSP signaling message; and
where the one or more processors, when determining the dynamic set of bypass LSPs, are to:
   determine the dynamic set of bypass LSPs based on receiving the LSP signaling message.

3. The device of claim 2, where the LSP signaling message includes the configuration information.

4. The device of claim 1, where the configuration information indicates a quantity of bypass LSPs to be initially determined; and
where the one or more processors, when determining the dynamic set of bypass LSPs, are to:
   determine the quantity of bypass LSPs indicated in the configuration information.

5. The device of claim 1, where the network traffic condition is associated with a Quality of Service (QoS) parameter.

6. The device of claim 1, where the one or more processors, when determining that the network traffic condition is satisfied, are to:
determine that a first network traffic condition is satisfied for a first bypass LSP included in the dynamic set of bypass LSPs; and
determine that a second network traffic condition is satisfied for a second bypass LSP included in the dynamic set of bypass LSPs.

7. The device of claim 1, where the one or more processors, when adding, removing, or reconfiguring the one or more bypass LSPs, are to:
   reconfigure the one or more bypass LSPs to add or remove one or more hops to a bypass LSP included in the dynamic set of bypass LSPs.

8. A non-transitory computer-readable medium storing instructions, the instructions comprising:
   one or more instructions that, when executed by one or more processors, cause the one or more processors to:
     determine a dynamic set of bypass label-switched paths (LSPs), to protect one or more protected LSPs, based on configuration information,
       the dynamic set of bypass LSPs being initially determined to include zero or more bypass LSPs, and
       the configuration information indicating:
         one or more conditions for modifying the dynamic set of bypass LSPs to add, remove, or reconfigure one or more bypass LSPs, and
         a maximum quantity of bypass LSPs permitted to be established for the dynamic set of bypass LSPs;
     monitor the dynamic set of bypass LSPs for a network traffic condition;
     determine that a condition, of the one or more conditions, is satisfied based on monitoring the dynamic set of bypass LSPs;
     modify the dynamic set of bypass LSPs based on determining that the condition is satisfied,
       where the one or more instructions, that cause the one or more processors to modify the dynamic set of bypass LSPs, cause the one or more processors to:
         verify that the maximum quantity of bypass LSPs will not be exceeded by adding a bypass LSP to the dynamic set of bypass LSPs; and
         add the bypass LSP to the dynamic set of bypass LSPs based on
           verifying that the maximum quantity of bypass LSPs will not be exceeded; and
     forward a data packet to a network node using a bypass LSP included in the modified dynamic set of bypass LSPs.

9. The non-transitory computer-readable medium of claim 8, where the configuration information indicates a quantity of bypass LSPs to be initially determined for the dynamic set of bypass LSPs; and
   where the one or more instructions, that cause the one or more processors to determine the dynamic set of bypass LSPs, cause the one or more processors to:
     determine the quantity of bypass LSPs indicated in the configuration information.

10. The non-transitory computer-readable medium of claim 8, where the configuration information indicates a minimum quantity of bypass LSPs permitted to be established for the dynamic set of bypass LSPs; and
    where the one or more instructions, that cause the one or more processors to modify the dynamic set of bypass LSPs, cause the one or more processors to:
      verify that the minimum quantity of bypass LSPs will be maintained when removing a bypass LSP from the dynamic set of bypass LSPs; and
      remove the bypass LSP from the dynamic set of bypass LSPs based on verifying that the minimum quantity of bypass LSPs will be maintained.

11. The non-transitory computer-readable medium of claim 8, where the one or more instructions, that cause the one or more processors to determine that the condition is satisfied, cause the one or more processors to:
    determine that a first condition, of the one or more conditions, is satisfied for a first bypass LSP included in the dynamic set of bypass LSPs; and
    determine that a second condition, of the one or more conditions, is satisfied for a second bypass LSP included in the dynamic set of bypass LSPs.

12. The non-transitory computer-readable medium of claim 8, where the one or more instructions, that cause the one or more processors to determine that the condition is satisfied, cause the one or more processors to:
    determine that the condition is satisfied when a bandwidth rate, associated with the dynamic set of bypass LSPs, is greater than or equal to a threshold bandwidth rate; and
    add a bypass LSP to the dynamic set of bypass LSPs based on determining that the bandwidth rate is greater than or equal to the threshold bandwidth rate.

13. A method, comprising:
    determining, by a device, a dynamic set of bypass label-switched paths (LSPs), to protect one or more protected LSPs, based on configuration information,
      the dynamic set of bypass LSPs being initially determined to include zero or more bypass LSPs, and
      the configuration information indicating at least one of:
        a first condition for adding a bypass LSP to the dynamic set of bypass LSPs,
        a second condition for removing a bypass LSP from the dynamic set of bypass LSPs, or
        a third condition for reconfiguring a bypass LSP included in the dynamic set of bypass LSPs, and
        a maximum quantity of bypass LSPs permitted to be established for the dynamic set of bypass LSPs;
    monitoring, by the device, the dynamic set of bypass LSPs for a network traffic condition;
    determining, by the device, that the network traffic condition, associated with the dynamic set of bypass LSPs, is satisfied based on monitoring the dynamic set of bypass LSPs;
    modifying, by the device, the dynamic set of bypass LSPs to add, one or more bypass LSPs based on determining that the network traffic condition is satisfied,
      where modifying the dynamic set of bypass LSPs comprises:
        verifying that the maximum quantity of bypass LSPs will not be exceeded by adding a bypass LSP to the dynamic set of bypass LSPs; and
        adding the bypass LSP to the dynamic set of bypass LSPs based on verifying that the maximum quantity of bypass LSPs will not be exceeded; and
    forwarding, by the device, a data packet to a network node using a bypass LSP included in the modified dynamic set of bypass LSPs.

14. The method of claim 13, where the configuration information indicates a quantity of bypass LSPs to be initially determined for the dynamic set of bypass LSPs; and
    where determining the dynamic set of bypass LSPs comprises:
      determining the quantity of bypass LSPs indicated in the configuration information.

15. The method of claim 13, where determining that the network traffic condition is satisfied comprises:
    determining that a first network traffic condition is satisfied for a first bypass LSP included in the dynamic set of bypass LSPs; and determining that a second network traffic condition is satisfied for a second bypass LSP included in the dynamic set of bypass LSPs.

16. The method of claim 13, where determining that the network traffic condition is satisfied comprises:
determining that the network traffic condition is satisfied when a bandwidth rate, associated with the dynamic set of bypass LSPs, is less than or equal to a threshold bandwidth rate; and
where the method further comprises:
removing a bypass LSP from the dynamic set of bypass LSPs based on determining that the bandwidth rate is less than or equal to the threshold bandwidth rate.

17. The method of claim 13, where the configuration information for the dynamic set of bypass LSPs includes different configuration parameters for different bypass LSPs in the dynamic set of bypass LSPs.

18. The device of claim 1, where the network traffic condition is associated with at least one of:
a latency parameter,
a jitter parameter,
a packet error rate parameter,
a bit rate parameter,
a throughput parameter,
a transmission delay parameter, or
an availability parameter.

19. The non-transitory computer-readable medium of claim 8, where the one or more instructions, that cause the one or more processors to monitor the dynamic set of bypass LSPs for a network traffic condition, cause the one or more processors to:
count a quantity of bytes associated with the dynamic set of bypass LSPs.

20. The method of claim 13, where the network traffic condition is associated with at least one of:
a latency parameter,
a jitter parameter,
a packet error rate parameter,
a bit rate parameter,
a throughput parameter,
a transmission delay parameter, or
an availability parameter.

* * * * *